United States Patent
Wang et al.

(10) Patent No.: US 8,624,535 B2
(45) Date of Patent: Jan. 7, 2014

(54) POWER SUPPLY CIRCUIT

(75) Inventors: En Hui Wang, Shenzhen (CN); Chi Ping Sun, Hong Kong (CN); Fei Xin, Shenzhen (CN)

(73) Assignee: Johnson Electric S.A., Murten (CH)

( * ) Notice: Subject to any disclaimer, the term of this patent is extended or adjusted under 35 U.S.C. 154(b) by 278 days.

(21) Appl. No.: 13/250,498

(22) Filed: Sep. 30, 2011

(65) Prior Publication Data

US 2012/0081052 A1    Apr. 5, 2012

(30) Foreign Application Priority Data

Sep. 30, 2010   (CN) .......................... 2010 1 0502035

(51) Int. Cl.
*H02P 6/14*    (2006.01)
(52) U.S. Cl.
USPC .................. 318/400.26; 318/503; 318/400.33
(58) Field of Classification Search
USPC .................. 318/400.26, 503, 400.33, 400.02, 318/400.13, 801, 400.27; 307/10.6, 10.1, 307/9.1
See application file for complete search history.

(56) References Cited

U.S. PATENT DOCUMENTS

| | | |
|---|---|---|
| 4,535,275 A | 8/1985 | Müller |
| 2009/0134700 A1* | 5/2009 | Tanaka et al. ................ 307/10.6 |

* cited by examiner

*Primary Examiner* — Karen Masih
(74) *Attorney, Agent, or Firm* — Muncy, Geissler, Olds & Lowe, PLLC

(57) ABSTRACT

A power supply circuit includes two half bridge circuits, a controller and two terminals for connecting a motor. The controller includes a signal input terminal, a phase inverter, a wiring board having four soldering pads, and two conductors. The four soldering pads are connected to the signal terminal, an output terminal of the phase inverter, control terminals of lower switches of the two half bridge circuits. Two ends of the first conductor are connected to the first and the fourth soldering pads and two ends of the second conductor are connected to the second and the third soldering pads. Alternatively, two ends of the first conductor are connected to the first and the third soldering pads and two ends of the second conductor are connected to the second and the fourth soldering pads.

10 Claims, 2 Drawing Sheets

POWER SUPPLY CIRCUIT

CROSS REFERENCE TO RELATED APPLICATIONS

This non-provisional patent application claims priority under 35 U.S.C. §119(a) from Patent Application No. 201010502035.7 filed in The People's Republic of China on Sep. 30, 2010.

FIELD OF THE INVENTION

This invention relates to a power supply circuit especially for an electric motor and in particular, to a power supply circuit having a full bridge circuit.

BACKGROUND OF THE INVENTION

FIG. 1 shows a conventional power supply circuit for a brushless direct current motor M. The power supply circuit includes a full bridge circuit having a first switching circuit 11 and a second switching circuit 12. The motor is arranged in the transverse branch of the full bridge circuit. Four switches K1~K4 of the bridge circuit are controlled to be conductive or blocked by four signals SN1~SN4. The term blocked refers to the switch being in an open or non-conductive state.

When the switches K1, K4 are conductive and the switches K2, K3 are blocked, current passes through the motor in a direction from a node a1 to a node a2. When the switches K2, K3 are conductive and the switches K1, K4 are blocked, current passes through the motor in a direction from the node a2 to the node a1. By controlling the two pairs of switches K1, K4 and K2, K3 to be alternately conductive, alternating current is supplied to the motor, which drives the motor to continuously rotate in a certain direction.

For some different applications driven by motors, such as two different fans whose curved vanes bends toward opposite directions, the motors are required to rotate in both directions. It is desired to apply a same power supply circuit to the different applications with minimal modifications.

SUMMARY OF THE INVENTION

Accordingly, the present invention provides a power supply circuit comprising a first switching circuit, a second switching circuit, a controller and two terminals for connecting a motor. Each of the two switching circuits comprises a first switch and a second switch. The first switch of the first switching circuit and the second switch of the second switching circuit forming a first pair of switches. The second switch of the first switching circuit and the first switch of the second switching circuit forming a second pair of switches. Each of the switches has an input terminal, an output terminal and a control terminal for receiving a signal for controlling the switch to be conductive or blocked. For each of the switching circuits, the output terminal of its first switch is connected to the input terminal of its second switch, the input terminal of its first switch being connected to a higher voltage, the output terminal of its second switch being connected to a lower voltage. The two terminals for connecting the motor are respectively connected to the input terminals of the second switches of the two switching circuits. The controller is adapted for controlling the first pair of switches and the second pair of switches to be alternately conductive and comprises a signal input terminal for receiving a switch control signal and a phase inverter for inverting the phase of the switch control signal. The controller further comprises a wiring board having a first to a fourth soldering pads, a first conductor and a second conductor, each of the conductors having two ends. The first soldering pad is connected to the signal input terminal, the second soldering pad is connected to an output terminal of the phase inverter, the third soldering pad is connected to the control terminal of the second switch of the first switching circuit, and the fourth soldering pad is connected to the control terminal of the second switch of the second switching circuit. The two ends of the first conductor are connected to the first soldering pad and the fourth soldering pad and the two ends of the second conductor are connected to the second soldering pad and the third soldering pad; or, the two ends of the first conductor are connected to the first soldering pad and the third soldering pad and the two ends of the second conductor are connected to the second soldering pad and the fourth soldering pad.

Preferably, the controller further comprises a first delaying unit and a second delaying unit which are adapted for respectively and independently delaying the conduction of the second switches of the two switching circuits.

Preferably, the controller further comprises a first delaying unit connected between the third soldering pad and the control terminal of the second switch of the first switching circuit and a second delaying unit connected between the fourth soldering pad and the control terminal of the second switch of the second switching circuit.

Preferably, the controller further comprises a first isolating unit connected between the signal input terminal and the phase inverter and a second isolating unit connected between the signal input terminal and the first soldering pad.

Preferably, the first switch of at least one of the two switching circuits is configured to follow the conductive state of the second switch of the other one of the two switching circuits.

Preferably, the control terminal of the first switch of at least one of the two switching circuits is connected to the input terminal of the second switch of the other one of the two switching circuits via a current limiter.

Preferably, the controller further comprises a voltage decreasing unit connected between the first isolating unit and the phase inverter.

Preferably, each of the isolating units has a high impedance operational amplifier, an optical transistor, or an electronic component having a P-N junction.

Preferably, each of the delaying units is a resistor-capacitor circuit, a capacitor of which is a stray capacitor in the corresponding second switch.

Preferably, the power supply circuit further comprises a sensor for detecting the position of a rotor of the motor, an output terminal of which is connected to the signal input terminal.

The power supply circuit in the present invention can be applied to different applications where the direction of rotation of the motor is required to be different, simply by connecting the two conductors to the four soldering pads in different ways. Therefore, the power supply circuit has good compatibility. Furthermore, as only a few electronic components are needed, the circuit is compact and the cost of the circuit is low.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
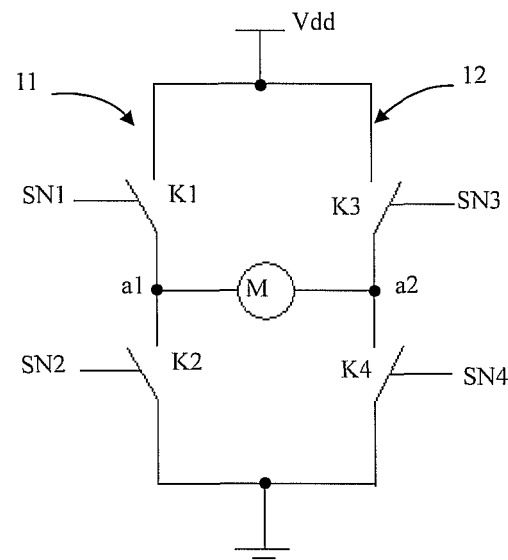
FIG. 1 is a prior art power supply circuit for an electric motor.
Figure 2:
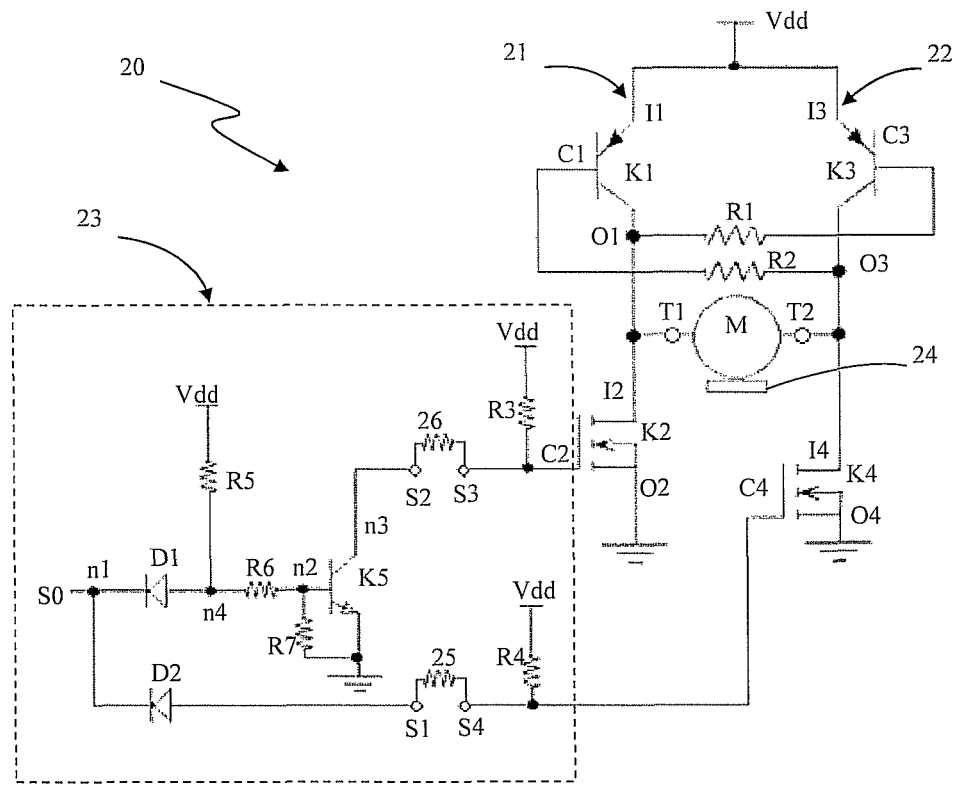
FIG. 2 is a first connecting way of a power supply circuit in accordance with a preferred embodiment of the present invention.

FIG. 2 shows a first connecting way of a power supply circuit 20 in accordance with a preferred embodiment of the present invention. The power supply circuit 20 is especially suitable for driving a brushless DC motor M having a permanent rotor and a stator with a stator winding. The power circuit 20 includes a first switching circuit 21, a second switching circuit 22 and a controller 23.

The first switching circuit 21 has two switches K1, K2 and the second switching circuit 22 has two switches K3, K4. Each of the switches K1~K4 has an input terminal, an output terminal and a control terminal for receiving a signal for controlling the switch to be conductive or blocked. In the embodiment, the switches K1, K3 are PNP transistors and the switches K2, K4 are N-channel MOSFETs. Sources O2, O4 of the switches K2, K4 function as output terminals and connected to ground. Gates C2, C4 of the switches K2, K4 function as control terminals. Emitters I1, I3 of the switches K1, K3 function as input terminals and connected to a direct current voltage Vdd. Bases C1, C3 of the switches K1, K3 function as control terminals and connected via current limiters R1, R2 to drains I4, I2 of the switches K4, K2 which function as input terminals. Collectors O1, O3 of the switches K1, K3 function as output terminals and connected to input terminals I2, I4 of the switches K2, K4. It should be understood that the switches K1~K4 are not limited to above configuration and alternatively could be other types such as Insulated Gate Bipolar Transistors (IGBT) and Gate Turn-Off Thyristors (GTO).

The stator winding of the brushless DC motor M is connected between two terminals T1, T2 which are connected to the input terminals I2, I4 of the switches K2, K4. Preferably, the power supply circuit 20 has a sensor 24 for detecting the position of the permanent rotor of the motor M. The sensor 24 may be Hall sensor, optical decoder or the like.

The controller 23 is adapted for controlling the pair of switches K1, K4 and the pair of switches K2, K3 to be alternately conductive, thereby the stator winding is supplied with an alternating current to drive the motor. The controller 23 comprises a signal input terminal n1 for receiving a switch control signal S0, a phase inverter K5 for inverting the phase of the switch control signal S0, and a wiring board for supporting and connecting the electronic components of the controller 23 and the switching circuits 21, 22. On the wiring board a first to a fourth soldering pads S1~S4 are formed and two conductors 26 are soldered. The second soldering pad S2 is connected to an output terminal n3 of the phase inverter K5. The third soldering pad S3 is connected to the control terminal C2 of the switch K2. The fourth soldering pad S4 is connected to the control terminal C4 of the switch K4.

Preferably, the controller 23 further includes two isolating units, a voltage decreasing unit and two delaying units for preventing the switches K1~K4 from forming a short circuit. The first isolating unit and the voltage decreasing unit are connected in series between the signal input terminal n1 and an input terminal n2 of the phase inverter K5. The second isolating unit is connected between the signal input terminal n1 and the first soldering pad S1. The first delaying unit for delaying the conduction of the switch K2 is connected between the third soldering pad S3 and the control terminal C2 of the switch K2. The second delaying unit for delaying the conduction of the switch K4 is connected between the fourth soldering pad S4 and the control terminal C4 of the switch K4. The two isolating units are adapted for isolating the two delaying units so as to make them respectively generate an independent delaying time without being interfered by each other.

In this embodiment, the output signal of the sensor 24 is transmitted to the signal input terminal n1 to function as the switch control signal S0. The first delaying unit includes a resistor R3 connected between the direct current voltage Vdd and the control terminal C2 of the switch K2. The second delaying unit includes a resistor R4 connected between the direct current voltage Vdd and the control terminal C4 of the switch K4. Each of the two resistors R3, R4 forms a resistor-capacitor circuit together with a stray capacitor of the corresponding switch so as to utilize charging process of the capacitor to delay the conduction of the switch. The first isolating unit includes a first silicon diode D1, the cathode of which is connected to the signal input terminal n1. The second isolating unit includes a second silicon diode D2, the cathode of which is connected to the signal input terminal n1, and the anode of which is connected to the first soldering pad S1.

The voltage decreasing unit includes a first resistor R6 and a second resistor R7. One end of the resistor R6 functions as the input terminal n4 of the voltage decreasing unit and connected to the anode of the first diode D1, the other end of the resistor R6 is functioned as output terminal n2 of the voltage decreasing unit and connected to one end of the resistor R7, and the other end of the resistor R7 is connected to ground. A third resistor R5 is connected between the direct current voltage Vdd and the input terminal n4 of the voltage decreasing unit. The phase inverter K5 includes a NPN transistor, the collector of which functions as the output terminal n3 of the phase inverter and connected to the second soldering pad S2, the emitter of which is connected to ground, and the base of which functions as the input terminal of the phase inverter and connected to the output terminal n2 of the voltage decreasing unit. In this embodiment, the function of the voltage decreasing unit is to avoid the phase inverter K5 to be wrongly conductive when the first diode D1 is conductive. Moreover, the voltage decreasing unit should avoid over decreasing the voltage at the output terminal n2 to a level lower than the conduction voltage of the transistor K5 when the input terminal n4 of the voltage decreasing unit is pulled to a high level by the pull-up resistor R5. Alternatively, each isolating unit may include other types of electronic component, such as high impedance operational amplifier, optical transistor, or other electronic component with a P-N junction.

In the first connecting way as shown in FIG. 2, two ends of the first conductor 25 are connected to the first soldering pad S1 and the fourth soldering pad S4, thereby the anode of the second diode D2 is connected to the control terminal C4 of the switch K4. Two ends of the second conductor 26 are connected to the second soldering pad S2 and the third soldering pad S3, thereby the output terminal n3 of the phase inverter is connected to the control terminal C2 of the switch K2. The conductors 25, 26 may be wires or resistors with small resistance.

Figure 4:
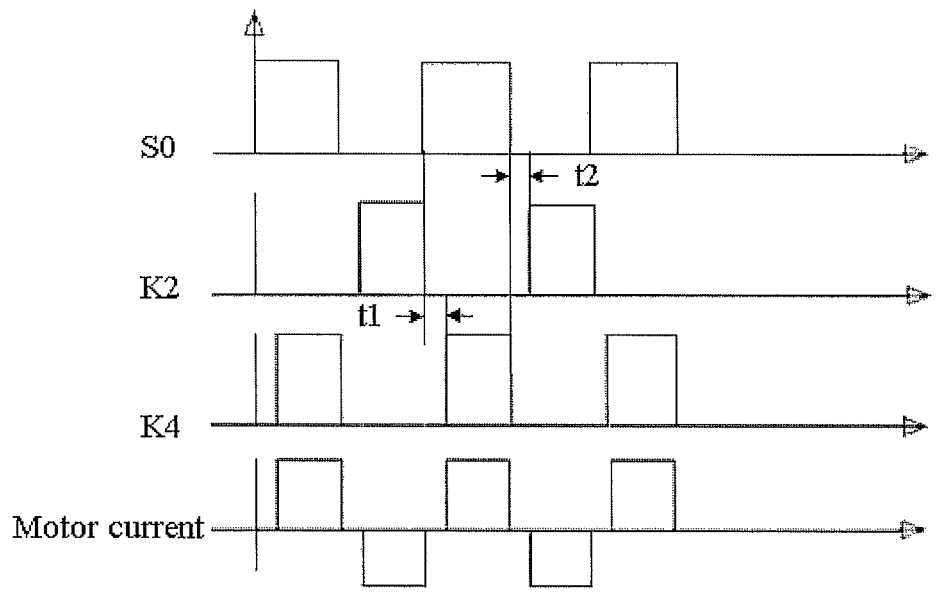
FIG. 4 is a graph showing dead zone times of the power supply circuit of FIG. 2.

The operation of the first connecting way will be described with reference to FIG. 4. When the voltage at node n1 is high, the first diode D1 is blocked, the voltage at node n4 is pulled to a high level by the resistor R5, and the voltage at the base of the transistor K5 is also high, which causes the transistor K5 to be conductive, thereby the voltage at node n3 is pulled down to ground and the switch K2 is blocked. On the other hand, when the voltage at node n1 is high, the second diode D2 is also blocked, the voltage at the control terminal C4 of the switch K4 is pulled to a high level by the resistor R4, which causes the switch K4 to be conductive, thereby the voltage at the input terminal I4 of the switch K4 is pulled to ground to cause the switch K1 to be conductive and then the voltage at the output terminal O1 of the switch K1 is pulled to a high level to cause the switch K3 to be blocked. In the process, the resistor R4 and the stray capacitor of the switch K4 form a RC circuit which delays the conduction of the switch K4 and generates a dead zone time t1 between the switch K4 and the switch K2.

Moreover, as the diodes D1, D2 are blocked, the delaying time of the conduction of the switch K4 is isolated from the voltage at the node n4. In the reverse case, that is, when the voltage at the node n1 is low, the second diode D2 is conductive, and the voltage at the control terminal C4 of the switch K4 is low, which causes the switch K4 to be blocked. On the other hand, the first diode D1 is also conductive, the voltage at the node n4 is low, which causes the switch K5 to be blocked, the voltage at the control terminal C2 of the switch K2 is pulled to a high level by the resistor R3, which causes the switch K2 to be conductive, thereby the voltage at the input terminal I2 of the switch K2 is pulled to ground to cause the switch K3 to be conductive and then the voltage at the output terminal O3 of the switch K3 is pulled to a high level to cause the switch K1 to be blocked. In the process, the resistor R3 and the stray capacitor of the switch K2 form a RC circuit which delays the conduction of the switch K2 and generates a dead zone time t2 between the switch K2 and the switch K4. In summary, the switches K4, K2 are alternately conductive under the control of the single switch control signal S0 and the switches K1, K3 follow the conductive states of the switches K4, K2 to supply the motor with an alternating current.

Figure 3:
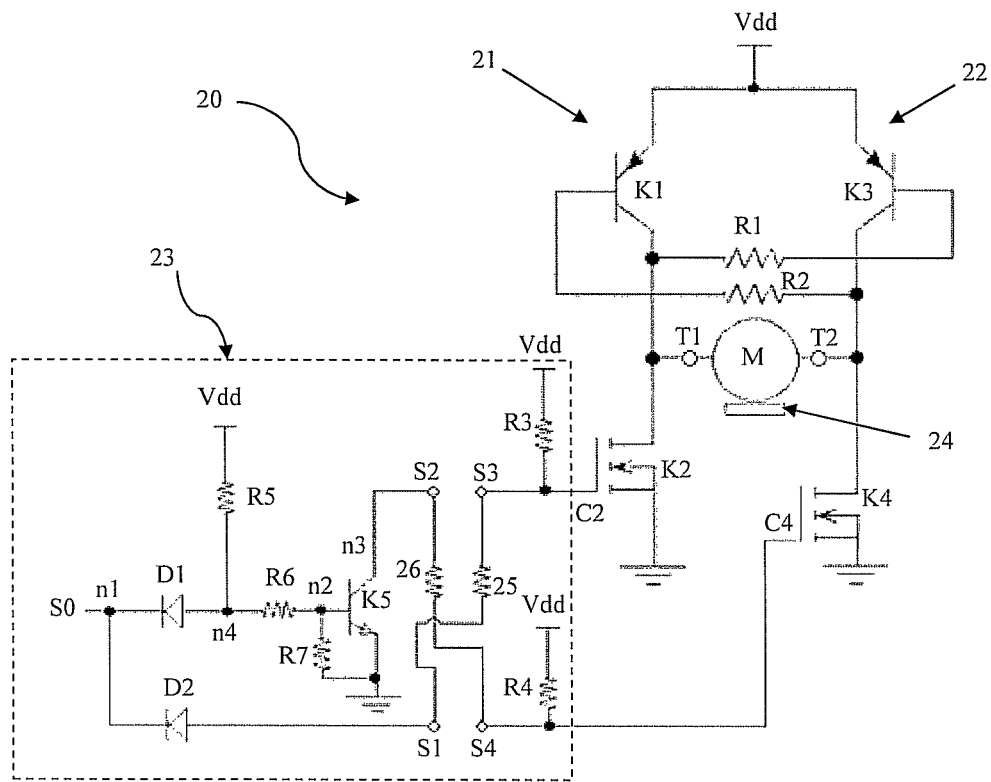
FIG. 3 is a second connecting way of the power supply circuit in accordance with the preferred embodiment of the present invention.

FIG. 3 shows a second way of connecting the power supply circuit 20 in accordance with the preferred embodiment of the present invention. In the second way, the first conductor 25 is connected between the first soldering pad S1 and the third soldering pad S3, thereby the anode of the second diode D2 is connected to the control terminal C2 of the switch K2. The second conductor 26 is connected between the second soldering pad S2 and the fourth soldering pad S4, thereby the output terminal n3 of the phase inverter is connected to the control terminal C4 of the switch K4. When the voltage at the node n1 is high, the transistor K5 is conductive, the switch K4 is blocked, and the switch K2 is conductive, which causes the switch K3 to be conductive and the switch K1 to be blocked. When the voltage at the node n1 is low, the transistor K5 is blocked, the switch K2 is blocked, and the switch K4 is conductive, which causes the switch K1 to be conductive and the switch K3 to be blocked.

In the first connecting way, the switches K1, K4 are conductive and the switches K2, K3 are blocked when the voltage of the switch control signal S0 is high, and the switches K1, K4 are blocked and the switches K2, K3 are conductive when the voltage of the switch control signal S0 is low. While in the second connecting way, the switches K1, K4 are blocked and the switches K2, K3 are conductive when the voltage of the switch control signal S0 is high, and the switches K1, K4 are conductive and the switches K2, K3 are blocked when the voltage of the switch control signal S0 is low. That is, for the same switch control signal S0, different pairs of switches will be conductive in the two connecting ways. It is known that if the pair of switches firstly being conductive changes, the direction that the motor rotates will also change. In other words, if the pair of switches firstly being conductive changes from K1, K4 to K2, K3, the direction of the current firstly flowing through the motor will change from the direction from T1 to T2 to the direction from T2 to T1, which makes the direction of rotation of the motor also change. Therefore, the power supply circuit can be conveniently applied to different applications where the direction of rotation of the motor is different, simply by connecting the two conductors 25, 26 to the four soldering pads S1~S4 in different ways.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A power supply circuit comprising a first switching circuit, a second switching circuit, a controller and two terminals for connecting a motor, wherein each of the two switching circuits comprises a first switch and a second switch, the first switch of the first switching circuit and the second switch of the second switching circuit forming a first pair of switches, the second switch of the first switching circuit and the first switch of the second switching circuit forming a second pair of switches;

each of the switches has an input terminal, an output terminal and a control terminal for receiving a signal for controlling the switch to be conductive or blocked; for each of the switching circuits, the output terminal of its first switch is connected to the input terminal of its second switch, the input terminal of its first switch being connected to a higher voltage, the output terminal of its second switch being connected to a lower voltage;

the two terminals for connecting the motor are respectively connected to the input terminals of the second switches of the two switching circuits;

the controller is adapted for controlling the first pair of switches and the second pair of switches to be alternately conductive and comprises a signal input terminal for receiving a switch control signal and a phase inverter for inverting the phase of the switch control signal;

the controller further comprises a wiring board having a first to a fourth soldering pads, a first conductor and a second conductor, each of the conductors having two ends;

the first soldering pad is connected to the signal input terminal, the second soldering pad is connected to an output terminal of the phase inverter, the third soldering pad is connected to the control terminal of the second switch of the first switching circuit, and the fourth soldering pad is connected to the control terminal of the second switch of the second switching circuit; and the two ends of the first conductor are connected to the first soldering pad and the fourth soldering pad and the two ends of the second conductor are connected to the second soldering pad and the third soldering pad; or, the two ends of the first conductor are connected to the first soldering pad and the third soldering pad and the two ends of the second conductor are connected to the second soldering pad and the fourth soldering pad.

2. The power supply circuit of claim 1, wherein the controller further comprises a first delaying unit and a second delaying unit which are adapted for respectively and independently delaying the conduction of the second switches of the two switching circuits.

3. The power supply circuit of claim 1, wherein the controller further comprises a first delaying unit connected between the third soldering pad and the control terminal of the second switch of the first switching circuit and a second delaying unit connected between the fourth soldering pad and the control terminal of the second switch of the second switching circuit.

4. The power supply circuit of claim 3, wherein the controller further comprises a first isolating unit connected between the signal input terminal and the phase inverter and a second isolating unit connected between the signal input terminal and the first soldering pad.

5. The power supply circuit of claim 1, wherein the first switch of at least one of the two switching circuits is configured to follow the conductive state of the second switch of the other one of the two switching circuits.

6. The power supply circuit of claim 1, wherein the control terminal of the first switch of at least one of the two switching circuits is connected to the input terminal of the second switch of the other one of the two switching circuits via a current limiter.

7. The power supply circuit of claim 4, wherein the controller further comprises a voltage decreasing unit connected between the first isolating unit and the phase inverter.

8. The power supply circuit of claim 4, wherein each of the isolating units has a high impedance operational amplifier, an optical transistor, or an electronic component having a P-N junction.

9. The power supply circuit of claim 3, wherein each of the delaying units is a resistor-capacitor circuit, a capacitor of which is a stray capacitor in the corresponding second switch.

10. The power supply circuit of claim 1, wherein the power supply circuit further comprises a sensor for detecting the position of a rotor of the motor, an output terminal of which is connected to the signal input terminal.

* * * * *